United States Patent [19]

Bruhnke et al.

[11] Patent Number: 5,076,821
[45] Date of Patent: Dec. 31, 1991

[54] FILTER ARRANGEMENT INSERTED IN THE INTAKE AIRFLOW OF A HEATING OR AIR-CONDITIONING SYSTEM OF A MOTOR VEHICLE

[75] Inventors: Ulrich Bruhnke, Ehningen; Klaus Arold, Sindelfingen, both of Fed. Rep. of Germany

[73] Assignee: Mercedes-Benz AG, Fed. Rep. of Germany

[21] Appl. No.: 645,249

[22] Filed: Jan. 24, 1991

[30] Foreign Application Priority Data

Jan. 31, 1990 [DE] Fed. Rep. of Germany ....... 4002754

[51] Int. Cl.⁵ .............................................. B01D 53/94
[52] U.S. Cl. ........................................ 55/163; 55/179; 55/213; 55/313; 55/344
[58] Field of Search ................ 55/179, 212, 312, 309, 55/324, 344, 387, 484, 313, 161, 163, 213; 98/2.11

[56] References Cited

U.S. PATENT DOCUMENTS

| | | | |
|---|---|---|---|
| 3,750,371 | 8/1973 | Gutman | 55/324 X |
| 3,926,595 | 12/1975 | Bockman | 55/324 X |
| 4,312,645 | 1/1982 | Mavros et al. | 55/213 |
| 4,512,147 | 4/1985 | Wong | 55/312 X |
| 4,625,511 | 12/1986 | Scheitlin et al. | 55/484 X |
| 4,702,753 | 10/1987 | Kowalczyk | 98/2.11 X |

FOREIGN PATENT DOCUMENTS

| | | |
|---|---|---|
| 0174742 | 3/1986 | European Pat. Off. . |
| 1161939 | 1/1964 | Fed. Rep. of Germany . |
| 3632524 | 3/1988 | Fed. Rep. of Germany . |
| 3737010 | 5/1989 | Fed. Rep. of Germany . |
| 2146258 | 4/1985 | United Kingdom . |
| 2148736 | 6/1985 | United Kingdom . |
| 2206295 | 1/1989 | United Kingdom . |

Primary Examiner—Charles Hart
Attorney, Agent, or Firm—Evenson, Wands, Edwards, Lenahan & McKeown

[57] ABSTRACT

A filter arrangement in the intake airflow of a heating or air-conditioning system of a motor vehicle, comprising two filters (preferably activated carbon filters), arranged offset and at a distance on behind the other relative to the direction of air flow, through each of which a partial volume of the air to be filtered flows. An air-guiding device is arranged upstream of the filters which feeds air proportionately to the two filters to produce a uniform supply. A wall capable of preventing flow round the rear filter, is provided between the two filters.

6 Claims, 1 Drawing Sheet

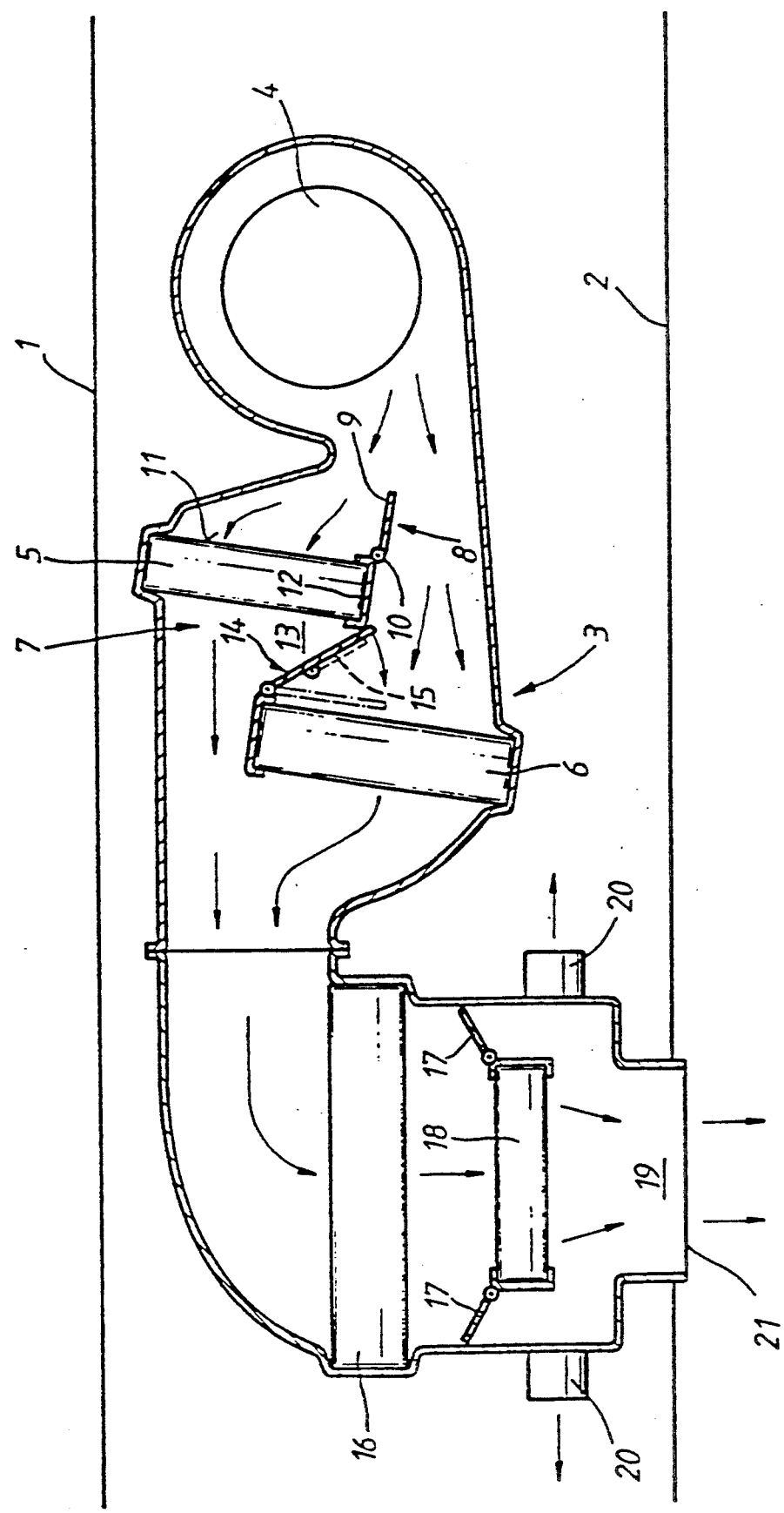

FILTER ARRANGEMENT INSERTED IN THE INTAKE AIRFLOW OF A HEATING OR AIR-CONDITIONING SYSTEM OF A MOTOR VEHICLE

BACKGROUND AND SUMMARY OF THE INVENTION

The invention relates to a filter arrangement inserted in the intake airflow of a heating or air-conditioning system of a motor vehicle, having two filters (preferably activated carbon filters) arranged offset and at a distance one behind the other in the direction of flow, and through each of which a partial volume of the air to be filtered flows.

A space-saving filter arrangement of this generic type, having a multiplicity of filters arranged offset one behind the other, is disclosed in German Offenlegungsschrift 3,632,524. The intention of this arrangement is to divide the intake airflow upstream of each filter into an air quantity flowing through the upstream filter and an air quantity flowing downstream around this filter, so that only filtered air should be present downstream of the last filter. However, this filter arrangement, with air quantities which vary greatly in practical operation, cannot fulfill these expectations, since it is impossible to prevent portions of the air quantity from being filtered several times unnecessarily, while there is no guarantee that all portions of the air quantity have in the final analysis flowed through a filter. This is all the more true since the filter resistance increases as the operating time increases, and the air leaves the arrangement largely unfiltered because of the possibility of bypassing the filters.

The object of the present invention is to provide a filter arrangement of the generic type described above which supplies air to the two filters uniformly, even in the case of unfavorable and changing flow conditions, and at the same time ensures that only treated air is present downstream of the filters.

This object is achieved in a filter arrangement according to the invention, wherein an air-guiding device, which feeds air proportionately to the two filters, is arranged upstream thereof. Further, to increase the service life of the filters and in the case of a temporarily high air requirement, it is possible to create a bypass permitting air to flow around the filters, by swivelling a wall which is disposed in air flow path, or by swivelling a flap arranged on the wall.

In a preferred illustrative embodiment of the invention, the air-guiding device is designed as a guide blade arranged in the transition zone between the front side and the left-hand boundary of the filter situated at the front in the direction of flow.

Even very different approach flow conditions, for example caused by greatly changing air quantities, can be compensated if the guide blade is swivellable. For the purpose of setting the guide blade automatically, the pressure drop in the two filters can be detected and the guide blade adjusted until at least approximately equal pressure drop values prevail.

Other objects, advantages and novel features of the present invention will become apparent from the following detailed description of the invention when considered in conjunction with the accompanying drawings.

BRIEF DESCRIPTION OF THE DRAWING

FIG. 1 is a cross sectional view of a filter arrangement according to the invention.

DETAILED DESCRIPTION OF THE DRAWING

Arranged in the space between the front panel 1 and the dashboard 2 of a motor vehicle (neither of which is shown in detail) is an air-conditioning system 3, the blower 4 of which sucks in fresh air and/or recirculated air to be freed from dust. After leaving the blower 4, the airflow indicated by arrows is divided and flows through two filters 5 and 6, arranged offset and at a distance one behind the other as seen in the direction of flow, of a filter arrangement 7, which, for the purpose of binding odorous substances and pollutants, is preferably designed as exchangeable activated carbon filters, and can be withdrawn downwards for the purpose of exchange.

The division of the airflow is achieved by an air-guiding device 8 designed as a swivellable guide blade 9. Its swivelling axis 10 extends in the corner region between the front side 11 and the left-hand boundary 12 of the filter 5 nearer to the blower. The guide blade 9 can effect the desired air-quantity division automatically, even in the case of differing flow conditions and unequal filter areas, by adjustment of its angular disposition around swivel axis 10 until both filters 5 and 6 exhibit at least the same pressure drop.

An air passage 13 is provided between filters 5 and 6 to allow a flow of air to bypass the filters, for example in areas where the air is pure or when a temporarily large volume of air is required. The flow of air through passage 13 is regulated by a swivellable wall 14. In the position shown in solid lines in FIG. 1, all air flow through passage 13 is blocked, thus preventing the flow of unfiltered air. However, the swivellable wall 14 can also be swivelled into the position indicated in broken lines, so as to augment the air flow with unfiltered air where desirable. Despite the bypass created in this way, a small air quantity continues to flow through the filters 5 and 6, a slow desorption thereby being achievable. Instead of a swivellable wall 14, it is also possible, in a manner not shown in detail, for a fixed wall to be provided which has a least one swivelling flap 15 as indicated.

The airflows passing through the two filters 5 and 6 unite before they enter an evaporator 16, downstream of which is arranged a heat exchanger 18 bypassable by flaps 17. Downstream of the heat exchanger 18, the air enters an air-distributing space 19 which has outlets 20 to lateral nozzles (not shown) and a forward pointing central nozzle 21. Further outlets (not shown) supply the footwells and the rear space of a passenger vehicle and the windscreen with conditioned and treated air as required.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Filter arrangement inserted in the intake airflow of a heating or air-conditioning system of a motor vehicle, comprising first and second filters arranged offset and at a distance one behind the other through each of which a partial volume of the air to be filtered flows, said first filter being disposed upstream and at least partially in front of said second filter relative to the direction of air flow, a wall connected between said filters and adapted to prevent air flow around the second filter so that said second filter can transmit airflow over its entire surface, and air guiding means disposed upstream of said filters for controlling the relative volume of air flow through said filters to produce a uniform supply.

2. Filter arrangement according to claim 1, wherein said filters are of the activated carbon type.

3. Filter arrangement according to claim 1, wherein the wall is adapted to be swivelled to create a bypass around said second filter.

4. Filter arrangement according to claim 1, wherein the wall is provided with at least one swivelling flap.

5. Filter arrangement according to claim 1, wherein the air-guiding means comprises a guide blade arranged in a transition zone upstream of said first and second filters and connected to an upstream front side and left-hand edge of the filter relative to the direction of flow.

6. Filter arrangement according to claim 5, wherein the guide blade is swivellable.

* * * * *